United States Patent
Ryan

(10) Patent No.: US 8,955,348 B2
(45) Date of Patent: Feb. 17, 2015

(54) VACUUM ASSISTED GROUND SOURCE HEAT PUMP DEVICE AND SYSTEM

(76) Inventor: Mark Ryan, Orlando, FL (US)

(*) Notice: Subject to any disclaimer, the term of this patent is extended or adjusted under 35 U.S.C. 154(b) by 90 days.

(21) Appl. No.: 13/306,613

(22) Filed: Nov. 29, 2011

(65) Prior Publication Data

US 2013/0133349 A1 May 30, 2013

(51) Int. Cl.
 *F24J 3/08* (2006.01)
(52) U.S. Cl.
 USPC .......... 62/260; 62/268; 62/100; 62/169
(58) Field of Classification Search
 CPC ........ F25B 29/003; F25B 19/00; F25B 19/02; F25B 1/06; F25B 30/06; F25B 13/00; F25D 31/00
 USPC ............. 62/260, 238.6, 238.7, 268, 169, 170, 62/100; 165/45
 See application file for complete search history.

(56) References Cited

U.S. PATENT DOCUMENTS

| | | | | |
|---|---|---|---|---|
| 2,167,878 A * | 8/1939 | Crawford | .............. | 165/263 |
| 2,299,531 A * | 10/1942 | Crawford | .............. | 62/157 |
| 2,345,548 A * | 3/1944 | Flosdorf et al. | ......... | 34/299 |
| 2,461,449 A * | 2/1949 | Smith et al. | ............ | 62/260 |
| 2,793,004 A * | 5/1957 | Schumann | .............. | 165/278 |
| 2,984,081 A * | 5/1961 | Hahn | .............. | 62/100 |
| 3,126,902 A * | 3/1964 | Fite et al. | .............. | 137/1 |
| 4,448,237 A * | 5/1984 | Riley | .............. | 165/45 |
| 4,489,568 A * | 12/1984 | Shapess | .............. | 62/324.1 |
| 4,577,679 A * | 3/1986 | Hibshman | .............. | 165/45 |
| 4,653,287 A * | 3/1987 | Martin, Jr. | .............. | 62/181 |
| 4,844,797 A * | 7/1989 | Wells | .............. | 210/104 |
| 5,505,056 A * | 4/1996 | Jones | .............. | 62/78 |
| 6,048,134 A * | 4/2000 | Mancini et al. | .......... | 405/128.2 |
| 8,047,275 B2 * | 11/2011 | Shim et al. | .............. | 165/297 |
| 2002/0148238 A1* | 10/2002 | Blume | .............. | 62/77 |
| 2007/0012556 A1* | 1/2007 | Lum et al. | .............. | 203/10 |
| 2009/0080979 A1* | 3/2009 | Zehler | .............. | 405/128.3 |
| 2010/0115978 A1* | 5/2010 | Simka | .............. | 62/238.7 |
| 2011/0017584 A1* | 1/2011 | Stevenson et al. | ............ | 203/11 |
| 2011/0253347 A1* | 10/2011 | Harrington | .............. | 165/104.31 |

* cited by examiner

*Primary Examiner* — Cassey D Bauer
*Assistant Examiner* — Kun Kai Ma
(74) *Attorney, Agent, or Firm* — Jason T. Daniel, Esq.; Daniel Law Offices, P.A.

(57) ABSTRACT

A ground source heat pump device and system includes a supply line for removing groundwater from an underground water source, a return line for returning the groundwater to the underground water source, and a heat pump that is able to utilize the supplied groundwater as a medium for transferring thermal energy between the groundwater and a refrigerant. In one embodiment, the heat pump can further include a circulation pump for circulating the groundwater through the system, and a vacuum unit for removing air from the system and filling the supply line, return line, heat exchanger and circulation pump with the groundwater.

6 Claims, 2 Drawing Sheets

VACUUM ASSISTED GROUND SOURCE HEAT PUMP DEVICE AND SYSTEM

BACKGROUND

1. Field of the Invention

The present invention relates generally to thermal gradient producing systems, and more particularly to a ground source heat pump device and system capable of utilizing a shallow body of groundwater as a source for thermal exchange.

2. Description of Related Art

As fossil fuels and other natural resources become more scarce, communities across the globe are looking for new ways to reduce power consumption by increasing the efficiency of every day items such as air conditioning and heat pump systems.

Conventional air source heat pumps act as a thermal gradient producing device by depositing and/or removing heat from a designated or "conditioned space." For example, in the cooling mode, the heat pump absorbs heat from the conditioned space and dissipates the heat into the warmer outside air environment. In the heating mode, the air source heat pump absorbs heat from the outside air environment and dissipates the heat into the conditioned air environment. However, as the temperature difference between the conditioned space and the outside environment increases, heat pumps must work harder to collect and dissipate the heat, thus depending on the season, or even the time of day, the heat pump's efficiency and effectiveness can vary greatly.

Moreover, it is known that liquids are a substantially better thermal transport medium than air. For this reason, liquid transfer mediums have been introduced into heat pumps in order to achieve a higher efficiency. There have been previous devices directed towards heat pump systems that utilize a fluid as the exchange medium between the heat pump system and the earth. Of these, there are essentially two types, the closed loop system and the open loop system.

Closed loop liquid thermal exchange systems typically utilize an underground tank or channels containing a thermal exchange liquid that is pumped through the heat exchanger of the heat pump in a sealed manner. By installing the tank underground, the system can take advantage of the relatively stable underground temperature, thereby preventing large fluctuations in the temperature of the exchange liquid when compared to the outside air. Accordingly, an overall improvement in the coefficient of performance of the heat pump unit itself can be achieved. However, closed loop thermal exchange systems require a significant amount of linear earth contact to ensure an effective exchange of thermal energy between the ground source heat pump system and the subterranean ground. To this end, it is often necessary to provide one or more bores or trenches that may be extremely deep or long, which are labor intensive and extremely costly to install.

Open loop liquid thermal exchange systems operate in a similar fashion to the closed loop systems but do not require a sealed tank or channels that must be buried underground. The open loop system instead utilizes shallow groundwater as the thermal exchange liquid. As such, it is necessary to include a well pumping device capable of pumping the groundwater from a shallow underground source, through the well pipe and into the heat pump system. However, most meaningful energy savings achieved by the heat pump unit is lost due to the operation of the well pump. Moreover, there is also the problem of where to dispose of the groundwater once it has been utilized by the system. In many instances, the groundwater output is inputted into an irrigation system, thus making the system even less efficient.

Accordingly, there remains a need for a hybrid-type ground source heat pump system that combines the energy efficiency of the closed loop system with the cost effectiveness and ease of installation allowed by the open loop system, and without the disadvantages of each.

SUMMARY OF THE INVENTION

The present invention is directed to a ground source heat pump system. One embodiment of the present invention can include a supply line for removing groundwater from an underground water source, a return line for returning the groundwater to the underground water source, and a heat pump that is able to utilize the supplied groundwater as a medium for transferring thermal energy between the groundwater and a refrigerant. In one embodiment, the heat pump can further include a circulation pump for circulating the groundwater through the system, and a vacuum unit for removing air from the system and filling the supply line, return line, heat exchanger and circulation pump with the groundwater.

Another embodiment of the present invention can include a vacuum assisted ground source heat pump device that includes a housing, a supply line, a discharge line, a circulating pump, a compressor assembly, one or more refrigerant lines, a heat exchanger for transferring heat between the refrigerant and the received water, and a vacuum unit for removing air from the device and creating a vacuum pressure.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described herein, a "water source heat pump", "ground source heat pump", "geoexchange heat pump", and "geothermal heat pump" are used interchangeably since the differences are most often determined by application and periphery. The commonality is the fact that most of these typically utilize a liquid as a medium for thermal exchange; however, there are some ground source heat pumps that utilize a method in which the thermal energy is transferred directly to and/or from the subterranean earth. For the purpose of this document, the term "ground source heat pump" will be used for any such heat pump that utilizes liquid for a thermal energy exchange medium, and utilizes the earth for a thermal sink; although the proper term should be the term "geoexchange heat pump".

Figure 1:
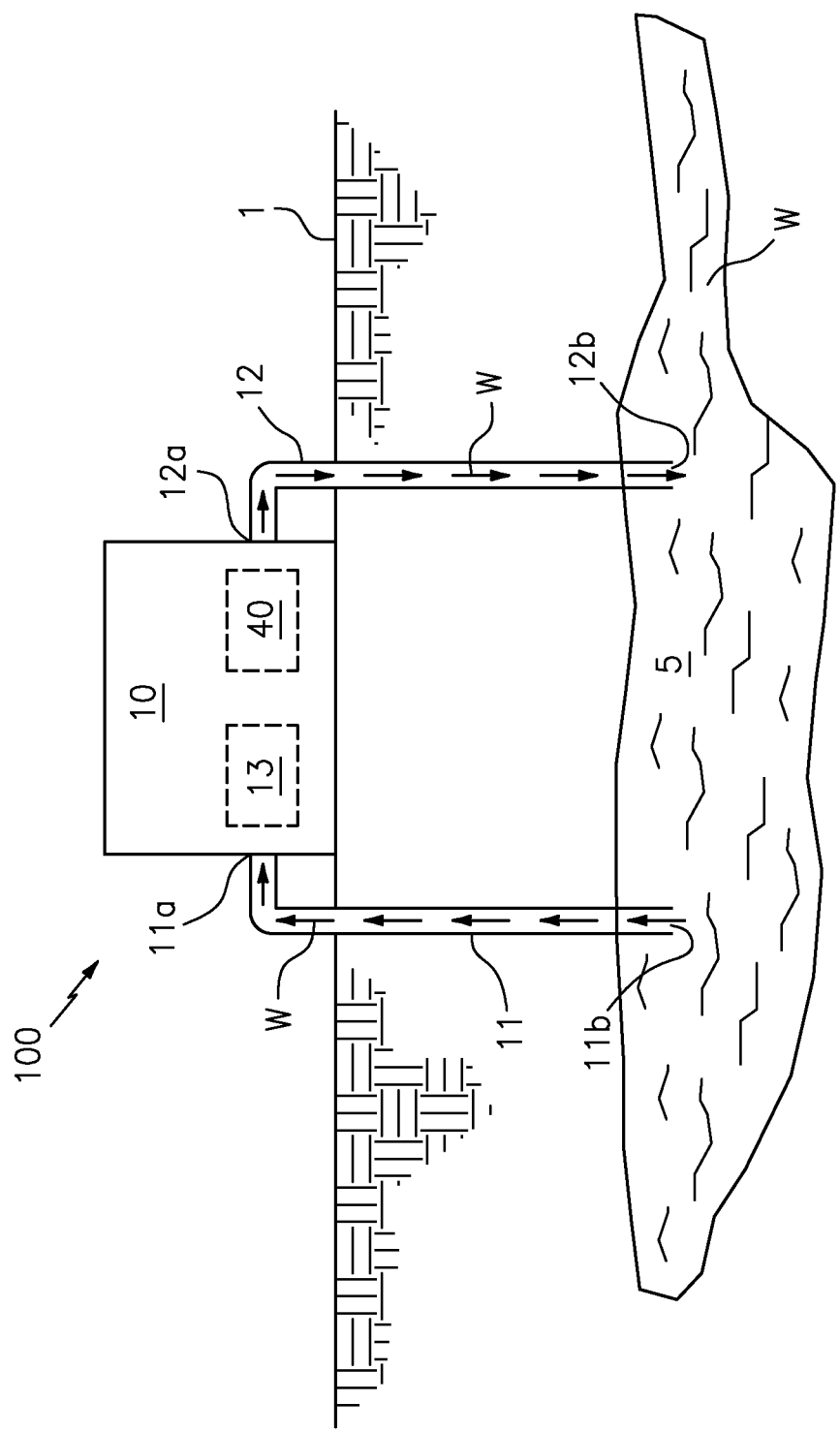
FIG. 1 illustrates a basic block diagram of a vacuum assisted ground source heat pump system that is useful for understanding the inventive concepts disclosed herein.

As described herein, the terms "upper," "bottom," "right," "left," "front," "vertical," "horizontal," and derivatives thereof, shall relate to the invention as oriented in FIG. 1.

Figure 2:
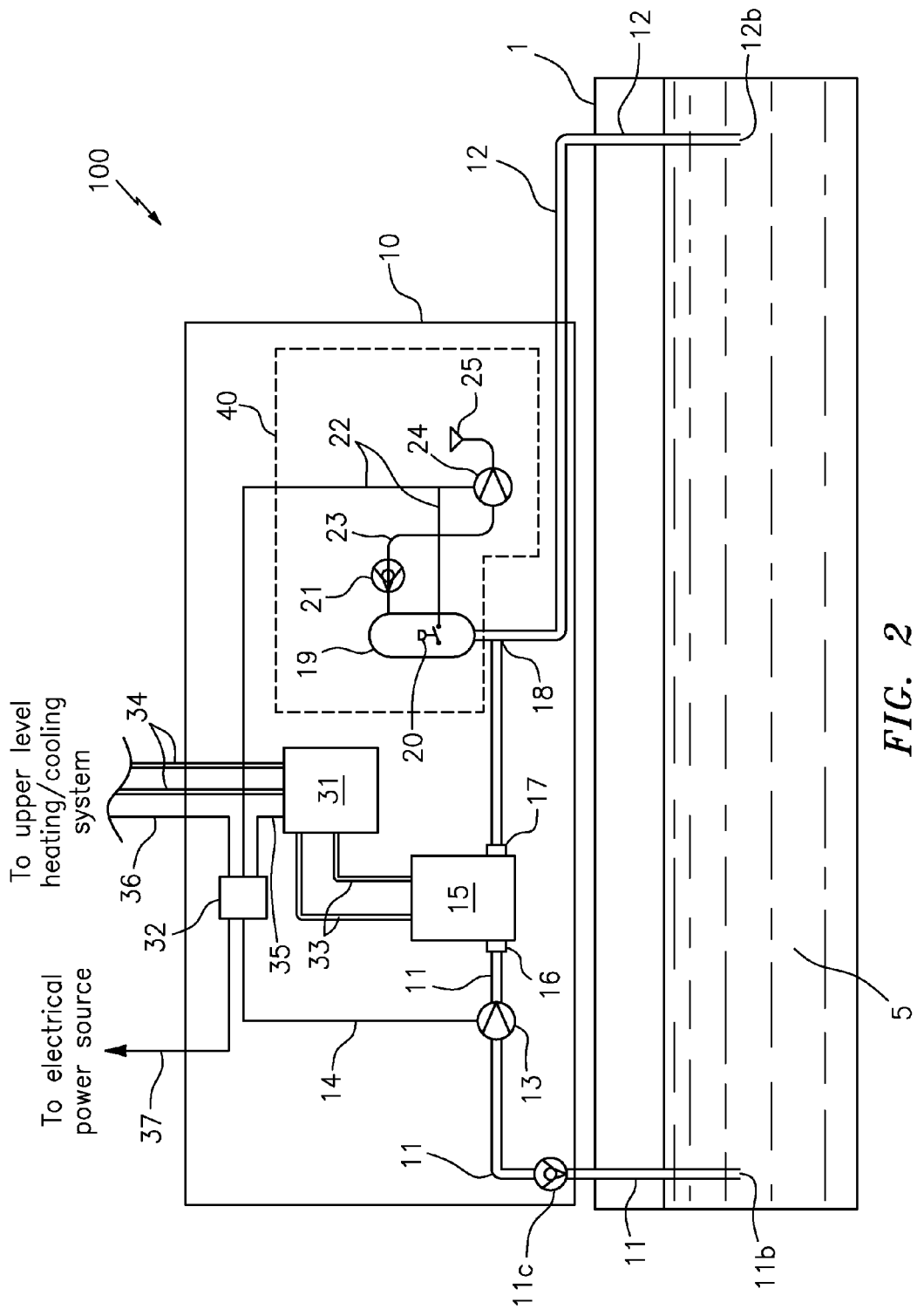
FIG. 2 is a front view of a vacuum assisted ground source heat pump system that includes a vacuum assisted ground source heat pump unit in accordance with one embodiment of the invention.

FIGS. 1 and 2 illustrate one embodiment of a vacuum assisted ground source heat pump system 100 that is useful for understanding the inventive concepts disclosed herein. As shown, the system 100 can include a vacuum assisted ground source heat pump device 10, that is configured to connect to an groundwater supply line 11, and a groundwater return line 12, in order to utilize groundwater W from an underground source 5.

The underground source 5 can include any pocket of water W (i.e. groundwater) that naturally saturates the earth below the ground surface 1. The groundwater temperature remains nearly constant throughout the seasons. The level of the groundwater source 5 is typically determined by many factors, mainly geographical and environmental, and will vary due to influences such as rainfall, atmospheric pressure, and human activity. In one preferred embodiment, the groundwater source will be located at or less than twenty-five feet below the ground surface 1. The groundwater should be of sufficient quality (i.e. lacking detrimentally high levels of limestone, calcium, led and other toxins) so as not to be detrimental to the elements of the invention. Groundwater W exists at a depth that is suitable for the vacuum assisted ground source heat pump system in many geographical areas.

In one embodiment, each of the groundwater supply line 11 and groundwater return line 12 can include one or more elongated hollow tubular members (such as metal or PVC, for example) having one end 11a and 12a, respectively connected to the heat pump 10 and the other end 11b and 12b, respectively, positioned within the groundwater source 5. It is preferred that ends 11b and 12b are positioned within the groundwater source 5 at a location that allows each of these ends to remained submerged in water W at all times. For example, below the lowest seasonal level of the groundwater source. Such a feature can allow the system 100 to maintain a consistent vacuum pressure at all times, as will be described below. Additionally, each of the groundwater supply line and groundwater return lines will be placed a sufficient distance from each other so as to prevent significant thermal exchange between the groundwater supply and the groundwater return, thus allowing the groundwater supply to act as a thermal sink. This distance can vary depending on the size of the system 100.

The vacuum assisted ground source heat pump device 10, according to one embodiment, can essentially include a conventional heat pump device having an internally located low-energy circulating pump 13 and vacuum unit 40 configured to receive a liquid (such as groundwater W, for example) from the groundwater supply line 11 and return the same to the groundwater return line 12. Accordingly, groundwater W can enter through the groundwater supply line 11, circulate through the device 10 in order to be used as a thermal transfer medium, and then be returned to the groundwater source 5 via the groundwater return line 12. As stated above, the ends of the groundwater supply line 11b and groundwater return line 12b will remain submerged within the underground source 5 at all times. Accordingly, once the lines have been primed and all air has been removed via the vacuum unit 40, groundwater W can flow through the system in a manner similar to a siphon, thus requiring little energy usage by the circulating pump 13 to both remove the groundwater and return it to the source 5.

As described herein, the vacuum unit 40 can include one or more devices, as will be described below, capable of removing air from the system, and creating a pressure sufficient to pull groundwater W from the source 5 and into the device, thus enabling the system to act in a manner similar to a closed loop system. In this way, the system 100 acts as a closed loop system without the need for an extensive network of underground piping and/or tanks.

FIG. 2 illustrates one embodiment of a vacuum assisted ground source heat pump device 10 that can be utilized by the system 100 described above. As shown, the ground source heat pump 10, can include:

A circulating pump 13 configured to move groundwater W from the underground source 5, through the heat pump device 10 and return the groundwater to the source via the groundwater return line 12. As shown, a water check valve 11c can be secured to the groundwater supply line prior to the circulating pump. The water check valve 11c can comprise a one way valve, configured to prevent water from back flowing into the source pipe.

A circulating pump control unit 14 is configured to control the operation of the circulating pump so as to allow the circulating pump to operate simultaneously with the compressor assembly of the vacuum assisted ground source heat pump device 10. The circulating pump control 14 powers on the circulating pump 13 by connection and signal from the heat pump control. Circulating pump control devices are well known in the art and can include an infinite number of combinations of electrical, electromechanical, and/or mechanical components to form a circuit that achieves this function. In one preferred embodiment, the circulating pump control unit can be integrated into the heat pump control described below.

A heat exchanger 15 is configured to transfer thermal energy between the groundwater and the refrigerant of the system 100, while keeping the groundwater and the refrigerant physically isolated. Heat exchangers are well known in the art, and are typically constructed of material such as copper and are able to contain the groundwater and refrigerant while they are at their operating pressures. As shown, the groundwater supply line 11 can be connected to a water inlet line 16 of the heat exchanger, and a water outlet line 17 can be secured to the outlet of the heat exchanger. In operation, groundwater passes through the heat exchanger from the water inlet to the water outlet. Refrigerant passes through the heat exchanger from a pair of refrigerant lines 33. The heat exchanger is indiscriminate, meaning that the heat exchanger will transfer heat from the hotter medium to the colder medium. This allows the vacuum assisted ground source heat pump system to be used for heating and cooling, such as when used in an air conditioning system.

The refrigerant lines 33 may be integral parts of the heat exchanger, or the refrigerant lines may be separate components that are attached to the refrigerant portion of the heat exchanger utilizing conventional methodologies and materials such as copper for refrigerant line connection. The refrigerant lines connect the heat exchanger to the compressor assembly 31. The refrigerant lines 33 are sized to meet the requirements of the vacuum assisted ground source heat pump system. The refrigerant lines utilize methodologies and components such as copper tubing that are consistent with connection of refrigerant conveying systems. The refrigerant lines convey the compressed or expanded refrigerant such as Freon® for example, between the compressor assembly and the heat exchanger.

The compressor assembly 31 is configured to compress the refrigerant so as to allow for the easy dissipation of thermal energy. The compressor assembly 31 may incorporate sensors, servicing valves, capacitors and other components that are customarily incorporated on refrigerant compressor assemblies. The compressor assembly may further include a reversing valve system that allows the vacuum assisted ground source heat pump system to be used for an upper level system such as an air conditioning system that provides heating and cooling. The compressor assembly is connected to the heat exchanger 15 by the refrigerant lines 33. In the cooling mode, the compressor assembly condenses the refrigerant in the heat exchanger via the refrigerant lines while expanding the refrigerant in the thermal exchanger of the upper level system. In the heating mode, the compressor assembly expands the refrigerant in the heat exchanger via the refrigerant lines while condensing the refrigerant in the thermal exchanger of the upper level system.

The compressor control 35 is configured to provide power and control the compressor assembly. The compressor control may provide directional control to a reversing valve of the compressor assembly if the vacuum assisted ground source heat pump is used for heating and cooling of the upper level system. Control devices are well known in the art and can include an infinite number of combinations of electrical, electromechanical, and/or mechanical components to form a circuit that achieves this function.

The refrigerant line set 34 connects the compressor assembly to the upper level heating and/or cooling system. Refrigerant lines 34 are sized to meet the requirements of the vacuum assisted ground source heat pump system. The refrigerant line set utilize methodologies and components such as copper tubing that are consistent with connection of refrigerant conveying systems. The refrigerant lines convey the compressed or expanded refrigerant between the compressor assembly and the thermal exchanger of the upper level system.

The heat pump control 32 is comprised of any combination of electrical, electronic, mechanical, and/or electromechanical components that achieve a proper operation of the vacuum assisted ground source heat pump. The heat pump control receives operational commands via the thermostat wiring and power from the power connection. The heat pump control provides power and control to the circulating pump, the vacuum pump, and the compressor assembly. The heat pump control may monitor system sensors and modify power and control throughout the vacuum assisted ground source heat pump in order to maximize efficiency and/or avert unsafe or detrimental operation. As shown, the heat pump control 32 can be connected to an electrical power source via one or more wires 37, and can be further connected to an external thermostat via wires 36.

The water/air tank 19 includes a bottom portion that is connected to the upper portion of the tee connection 18. It is preferably positioned close to and above the tee connection. The bottom of the water/air tank is connected to the tee connection utilizing conventional plumbing methodologies and components, such as PVC, that ensure a water tight and air tight system. The water/air tank is of sufficient size to accommodate the connection to the tee connection, the level switch, and the connection to the vacuum check valve. The water/air tank can be constructed of metal, fiberglass, PVC, or any material that is impervious to groundwater and any vapors that may escape from the groundwater. The water/air tank is constructed so as to be airtight and water tight. The water/air tank is constructed to be able to withstand an internal vacuum.

A level switch 20 can be mounted internally to the water/air tank above the water/air tank connection to the tee connection. The level switch 20 is preferably mounted so that a signal will be generated when the water level in the water/air tank reaches the level switch. The level switch is mounted so that the generated signal can be conveyed through the wall of the water/air tank by a means that is airtight and watertight. The level switch is connected to the vacuum pump control. The level switch can be electrical, mechanical, electromechanical, or optical, providing that the signal generated by the level switch interfaces with the vacuum pump control. The level switch is constructed of materials that are impervious to groundwater or any vapors that may escape from the groundwater. One suitable example of a level switch for use herein includes model LS-7 compact side-mounted level switch constructed by Gems Sensors®. Of course other such devices are also contemplated.

The vacuum pump control 22 is connected to the level switch 20, the vacuum pump 24, and the heat pump control 32. The vacuum pump control 22 can apply power to the vacuum pump when the vacuum pump control receives a signal from the level switch indicating that the groundwater level in the water/air tank is below the level of the level switch. The vacuum pump control removes power from the vacuum pump when the vacuum pump control receives a signal from the level switch that the groundwater level in the water/air tank is at the level of the level switch. Control devices are well known in the art and can include an infinite number of combinations of electrical, electromechanical, and/or mechanical components to form a circuit that achieves this function. In one preferred embodiment, the vacuum pump control will be integrated into the heat pump control.

The vacuum check valve 21 can include a conventional one way valve, configured to allow air to pass in one direction only when there is a pressure difference between the input and the output of the vacuum check valve, even at sub-atmospheric pressure. The input side of the vacuum check valve is connected to the water/air tank above the level switch so as to form an airtight connection. The output side of the vacuum check valve is connected to the vacuum line so as to form an airtight connection. The vacuum check valve is directionally orientated so as to allow air or vapor to flow only from the water/air tank to the vacuum line. The vacuum check valve is constructed of materials that are impervious to vapors that may escape from the groundwater. The vacuum check valve is sized minimally to achieve this function and to meet the requirements of the vacuum assisted ground source heat pump system.

The vacuum line 23 can include an elongated tubular member that is airtight and able to withstand an internal vacuum. The vacuum line is preferably constructed of material such as polyethylene tubing that is impervious to vapors that may escape from the groundwater. One end of the vacuum line is connected to the output of the vacuum check valve 21 so as to form an airtight connection. The other end of the vacuum line is connected to the input of the vacuum pump 24 so as to form an airtight connection.

The vacuum pump 24 can act to remove air and/or vapor from the water/air tank in order to allow the pressure in the water/air tank to fall below atmospheric pressure. Vacuum pumps are known in the art, and are preferably constructed of materials that are impervious to vapors that may escape from the groundwater. The vacuum pump 24, according to one embodiment, is of sufficient capacity to produce a vacuum strong enough in the water/air tank that will lift the groundwater up through the groundwater supply line 11 and into the water/air tank 19. At commission of the vacuum assisted ground source heat pump system, the vacuum pump 24 can create a vacuum that causes the groundwater supply line 11, the groundwater return line 12, the circulating pump 13, the heat exchanger 15, and the tee connection 18 to fill with groundwater W. This action is substantially identical to the action of drawing a beverage into one's mouth using a straw. Once the groundwater has filled the water/air tank 19 to a sufficient level as to activate the level switch 20, the pump 24 will be shut off, as described above.

The vacuum pump discharge 25 couples the air and vapor from the output of the vacuum pump 24 to the outside environment through a mesh, screen or filter (not shown). The vacuum pump discharge allows the passage of air and vapor out of the vacuum pump, but prevents the intrusion of foreign material or debris into the vacuum pump.

Although described above as separate elements, one of skill in the art will recognize that many of the above identified components can be combined to achieve the goals set forth for each individual element. For example, one or more of the water/air tank 19, level switch 20, vacuum pump control 22, vacuum check valve 21, vacuum line 23, vacuum pump 24, and/or vacuum pump discharge 25, can be combined in either form or function to form a vacuum unit 40. Additionally, as heat pumps and their associated components are known in the art, many of the above mentioned elements, such as the heat exchanger, compressor, refrigerant lines, controllers, valves and the like are illustrated for ease of understanding, and are not limiting on this invention.

As described above, each component that conveys groundwater through the vacuum assisted ground source heat pump system is sealed with the exception of the ends of the groundwater supply line 11b and groundwater return line 12b. However, as each of these ends remain submerged within the groundwater source 5, the system remains primed (i.e. vacuum sealed) at all times, without losing suction. Further, while in operation, the vacuum pump 24 remains off except for momentary operation to maintain the water level in the water/air tank 19 which may be affected due to atmospheric pressure change, change in groundwater level below the ground surface, or increase in air pressure inside the water/air tank caused by vapors escaping from the groundwater inside the water/air tank. During the period that the vacuum pump is not operating, the vacuum check valve prevents atmospheric air from passing from the outside environment back through the vacuum pump and vacuum line into the water/air tank.

Moreover, it is necessary that the tee connection and the water/air tank be at the highest point of the groundwater conveying part of the vacuum assisted ground source heat pump system. That is, groundwater flowing through the groundwater conveying part of the vacuum assisted ground source heat pump system to the tee connection will travel in an upward direction, and groundwater flowing through the groundwater conveying part of the vacuum supplied groundwater source system away from the tee connection will travel in a downward direction, thus ensuring that any air or vapor in the groundwater conveying part of the vacuum supplied groundwater source system will rise to the water/air tank and be removed as described above.

Accordingly, the vacuum assisted ground source heat pump 10 and system 100 is more energy efficient than a traditional open loop system because the energy required to lift groundwater from the underground source is provided by the flow of the spent water returning to the underground source in a manner similar to a siphon. Additionally, by returning all of the groundwater that is utilized back to the source, there is virtually no net consumption of groundwater, which further enhances the environmentally friendly aspects of the device.

Although described above as utilizing specific elements, one of skill in the art will recognize that other similar individual components can also be utilized herein with minimal alterations. To this end, some elements can be placed externally to the cabinet of the vacuum assisted ground source heat pump. An infinite combination of element lengths and orientations of the water conveying elements could be configured to create the vacuum assisted ground source heat pump system. The essence of the invention can be completely preserved even though additional elements can be added to the invention such as valves and ports for the purpose of servicing the invention.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A ground source heat pump system for utilizing groundwater as a thermal exchange medium, said system comprising:
   a supply line configured to remove groundwater from an underground water source;
   a return line configured to return the groundwater to the underground water source;
   one or more check valves that are disposed within one of the supply line, each of said one or more check valves being configured to prevent groundwater that is thermally affected by the system during an on-operating state from back flowing into the system when the system is in an off-operating state; and
   a heat pump unit that is in communication with the supply line and the return line, said heat pump unit including a heat pump control unit configured to receive a user input and control an operation of the heat pump unit, a pair of refrigerant lines that are interposed between a compressor and a heat exchanger, said heat exchanger being configured to utilize the groundwater supplied from the supply line as a medium for transferring thermal energy between the groundwater and a refrigerant located within the pair of refrigerant lines, and heat exchanger, a circulation pump configured to selectively move the groundwater through each of the supply line, the return line and the heat exchanger, and a vacuum unit consisting of: a water tank that is positioned above, and connected to the return line, a level switch that is located within the water tank, a vacuum pump that is connected to the water tank via a vacuum line, a vacuum check valve that is interposed between the water tank and the vacuum an air discharge valve that is in communication with the vacuum pump, and a vacuum pump control that is in communication with each of the level switch, the vacuum pump, and the heat pump control unit, wherein the vacuum unit is configured to remove air and extraneous gases from each of the supply line, the circulation pump, the heat exchanger, the water tank and the return line creating a hydraulically continuous path from the supply line to the return line, thereby creating a siphon effect that reduces an amount of force required for the circulation pump to move the groundwater through each of the supply line, the return line and the heat exchanger.

2. The ground source heat pump system of claim 1, wherein the vacuum unit is further configured to maintain a full water supply in each of the supply line, return line, heat exchanger and circulation pump at all times.

3. The ground source heat pump system of claim 1, wherein said system is configured to access an underground water source that is located less than twenty-five feet below a level switch positioned within the system.

4. The ground source heat pump system of claim 1, wherein one end of each of the supply line and return line are configured to remain submerged in groundwater at all times.

5. The ground source heat pump system of claim 1, wherein said vacuum controller functions to engage the vacuum pump when the level switch indicates that the groundwater within the tank is below a predetermined threshold, and to deactivate the vacuum pump when the level switch indicates that the groundwater within the tank is at or above a predetermined threshold.

6. The ground source heat pump system of claim 1, wherein the vacuum pump functions to pull the groundwater through the supply line from the underground water source.

* * * * *